Patented Sept. 1, 1925.

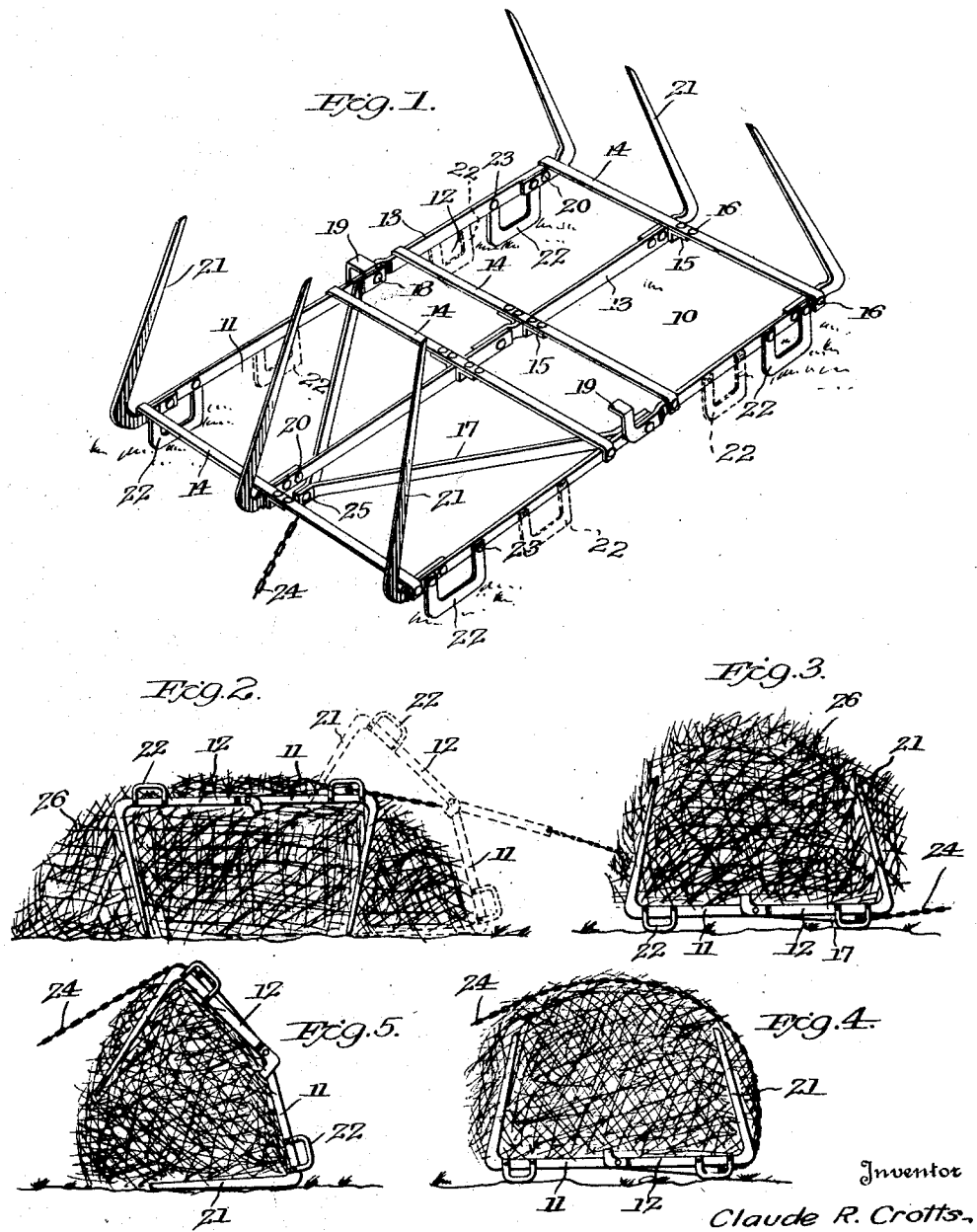

1,551,802

UNITED STATES PATENT OFFICE.

CLAUDE R. CROTTS, OF TURON, KANSAS.

CARRIER.

Application filed January 31, 1925. Serial No. 6,069.

*To all whom it may concern:*

Be it known that I, CLAUDE R. CROTTS, a citizen of the United States, residing at Turon, in the county of Reno and State of Kansas, have invented new and useful Improvements in a Carrier, of which the following is a specification.

This invention relates to carriers and more particularly to a device for loading, transporting and unloading material such as straw, hay, brush or the like.

An essential feature of the invention is to provide a carrier preferably composed of two sections movably connected at their adjacent ends and supported by runners, so as to permit the device to drag easily along the ground. Each of the sections has connected to their outer ends upwardly and inwardly inclined arms so arranged that when the carrier is inverted and the arms thrust into the material and the load moved forward, the sections will move inward as the carrier is swung over on the runners, thus causing the arms to firmly engage the material.

A further object of the invention consists in attaching a draft bar to the carrier in such a manner that when the same is moved forward it will permit the device to be loaded, and when the direction is reversed the load can be readily unloaded.

Referring to the drawings, wherein is set forth the preferred embodiment of the invention:

Figure 1 is a perspective view of the carrier;

Figure 2 is a side elevational view showing the carrier about to lift a load, and in dotted lines the position assumed by the device when it is moved forward;

Figure 3 is a side elevational view showing the position of the load after the carrier has been turned over on the runners;

Figure 4 is a side elevational view of the carrier and the position it assumes when the material is unloaded; and Figure 5 is a side elevational view illustrating the manner in which the material is unloaded from the carrier.

Referring to the drawings, in which like numerals indicate like parts in the several views, 10 indicates the body or frame of the carrier which is preferably composed of any suitable light and strong metallic material such as carbon steel and is formed in two sections 11 and 12, each of which is composed of a series of longitudinally extending bars 13 preferably three in number and the transverse bars 14, which are connected together by any suitable means such as the brackets 15 and the bolts 16. A draft bar 17 substantially triangular in formation and the adjacent inner ends of the sections 11 and 12 are pivoted to the side bars 11 by the bolts 18. The inward swinging movement of the sections 11 and 12 relative to each other is limited by means of the inwardly extending flanged members or stops 19 formed on either of the adjacent ends of the sections 11 and 12, and in the present instance shown as integral with the side bars 13 of section 12.

The outer side bars 13 have connected thereto by the bolts 20 upwardly projecting tapered prongs or arms 21, which preferably are inclined or converge inwardly so that when the carrier is inverted and the arms thrust into the material to be transported they will firmly grip the same. While I have conventionally shown the carrier provided with six of these arms 19 it is to be understood that any number may be employed, depending upon the particular size or weight of the load to be carried.

The carrier is arranged to be dragged along the ground by means of the runners 22 which are connected to the outer ends of the side bars 13 by the bolts 23. The device is preferably moved by horses which are connected to the draft bar 17 by the chains 24 secured to the forward end of the draft bar in any suitable manner, as at 25. The chain 24 is of sufficient length to permit it to be drawn back over the material when it is desired to unload the carrier.

The operation of the carrier is as follows:

Assuming it is desired to transport the material 26, as shown in Figure 2, from a windrow to any other suitable point, the frame 10 being composed of light metal, is picked up and the prongs 21 thrust into the material in the manner as shown in Figure 2. The carrier is then drawn forward and is picking up the load assumes the position as indicated in dotted lines in Figure 2. Due to the constant power applied to the draw bar 17 by the horses, the body 10 quickly turns over with its load on the runners 22 and assumes the position as shown in Figure 3. When the material has been conducted to the place where it is to be unloaded, the horses are turned around, and the chain 24 is passed over the load in the manner as indicated in Figure 4. Upon the horses pulling in the opposite direction from that in which they have been previously traveling, the carrier will be tilted so as to assume the position as shown in Figure 5. In order that all the material may be emptied at this point, it is necessary for the driver to hold the upper end of the section 12, shown in Figure 5, so as to prevent the arms 21 from moving inward and again picking up the material.

If it is not desired to empty the entire load at one place, any part of it may be retained on the carrier by the driver releasing the upper end of the section 12, which causes the adjacent arms 21 to engage the material. Upon throwing the chain over the load and reversing the direction the carrier will be turned completely over and unloaded and will fall back on the runners 22 so as to be ready for use for transporting a new load of material.

Instead of the runners or skids 22 being positioned at the outer ends of the sections 11 and 12, they may be located nearer the center of the frame 10, as indicated in dotted lines in Figure 1, so as to more effectively sustain or balance the load.

It is to be understood that the form of invention herein shown and described is merely illustrative and in no sense restrictive and that such changes as fall within the purview of one skilled in the art may be made without departing from the spirit of the invention and the scope of the appended claims.

I claim:

1. A carrier of the class described comprising a sectional body, means movably connecting the adjacent ends of the sections together, upwardly projecting prongs extending from the ends of said body, runners connected to the underside of said body, and a draft bar pivoted to the sides of said body at points intermediate the length thereof.

2. A carrier of the class described comprising a normally horizontal sectional body, means movably connecting the adjacent ends of the sections together, upwardly projecting prongs extending from the ends of said body, runners secured to the underside of the body, and a draft bar pivoted to the sides of said body at points intermediate the length thereof.

3. A carrier of the class described comprising a normally horizontal sectional body, means movably connecting the adjacent ends of the sections together, means on one of the sections adapted to engage the other section so as to limit the inward swinging movement of said sections, upwardly projecting prongs extending from the ends of said body, runners secured to the underside of the body, and a draft bar pivoted to the sides of said body at points intermediate the length thereof.

4. A carrier of the class described comprising a normally horizontal sectional body, means movably connecting the adjacent ends of the sections together, upwardly projecting converging prongs extending from the ends of said body, runners secured to the underside of the body, and a draft bar pivoted to the sides of said body at points intermediate the length thereof whereby upon the prongs being thrust into the material to be carried and the draft bar moved forward, the sections will move inward as the body is swung over the runners, causing the prongs to firmly engage the material.

5. A carrier of the class described comprising a sectional body, means movably connecting the adjacent ends of the sections together, said body normally assuming a horizontal position, inwardly projecting arms extending upwardly from the ends of the body, each of said arms terminating in a pointed end, runners connected to the underside of the body, and a draft bar pivoted to the sides of said body at points intermediate the ends thereof, whereby upon the arms being thrust into the material to be carried and the draft bar moved forward, the body will be swung over on the runners causing the arms to firmly grip the material.

In testimony whereof I have hereunto set my hand.

CLAUDE R. CROTTS.